Figure 3:
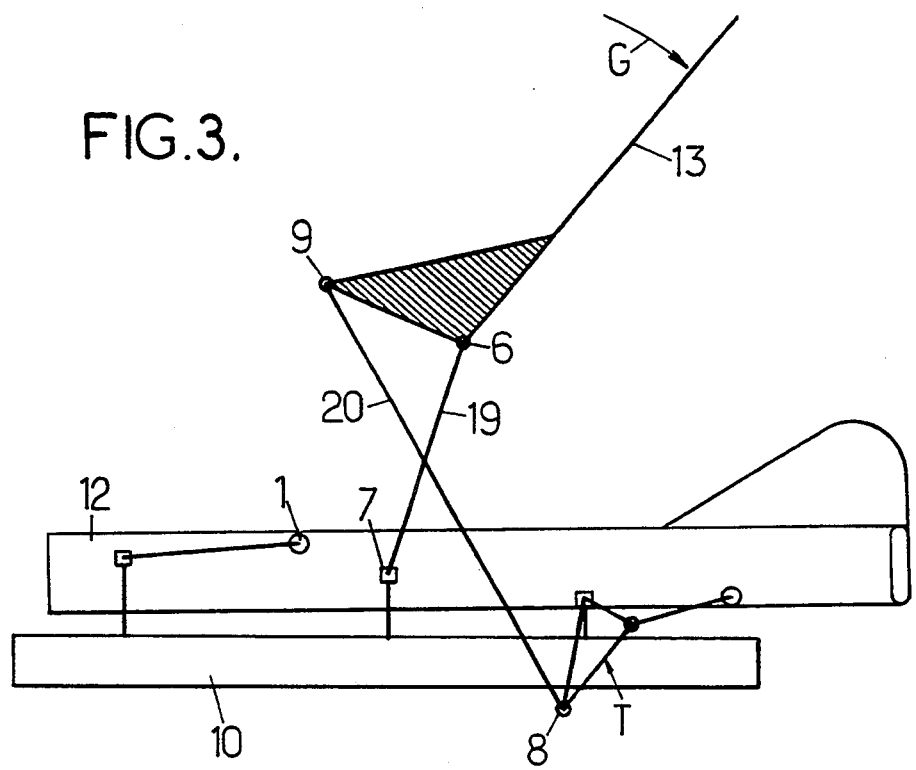

United States Patent [19]
Judic et al.

[11] Patent Number: 5,358,308
[45] Date of Patent: Oct. 25, 1994

[54] VEHICLE SEATS HAVING MULTIPLE ADJUSTMENTS

[75] Inventors: Jean-Marc Judic, Orsay; Joël Canteleux, Armenonville, both of France

[73] Assignee: Bertrand Faure Automobile "BFA", Massy, France

[21] Appl. No.: 78,077

[22] Filed: Jun. 18, 1993

[30] Foreign Application Priority Data

Jun. 18, 1992 [FR] France ................ 92 07428

[51] Int. Cl.⁵ ........................................... A47C 1/02
[52] U.S. Cl. ................................... 297/316; 297/317; 297/322; 297/340
[58] Field of Search ............... 297/316, 317, 327, 337, 297/340, 378.1, 354.12

[56] References Cited

U.S. PATENT DOCUMENTS

| | | | |
|---|---|---|---|
| 3,269,769 | 8/1966 | Mizelle | 297/322 |
| 3,300,243 | 1/1967 | Mizelle | 297/322 |
| 3,869,172 | 3/1975 | James et al. | 297/340 |
| 4,362,336 | 12/1982 | Zapf et al. | 297/317 |

FOREIGN PATENT DOCUMENTS

| | | |
|---|---|---|
| 0205409 | 12/1986 | European Pat. Off. . |
| 0445528 | 2/1991 | European Pat. Off. . |
| 2945559 | 5/1981 | Fed. Rep. of Germany . |
| 3843684 | 7/1990 | Fed. Rep. of Germany . |
| 2556294 | 6/1985 | France . |

*Primary Examiner*—John T. Kwon
*Attorney, Agent, or Firm*—Larson and Taylor

[57] ABSTRACT

The vehicle front seat comprises a seat proper (12) mounted on a base (10) by means of two oblique rods (14 and 15) and a back (13) pivotally mounted firstly about an inclination adjusting axis (6) and secondly about an axis (7) for folding the back down forwards, which axis is secured to the base. The bottom axis (4) of the front rod is connected to an axis (5) secured to the base via the short side (16) of a rigid triangle (T), a long rod (20) is pivotally mounted firstly about an axle (8) secured to the triangle and secondly about an axis (9) secured to the back, and a fourth rod (19) interconnects the two hinge axes (6 and 7) of the back.

6 Claims, 2 Drawing Sheets

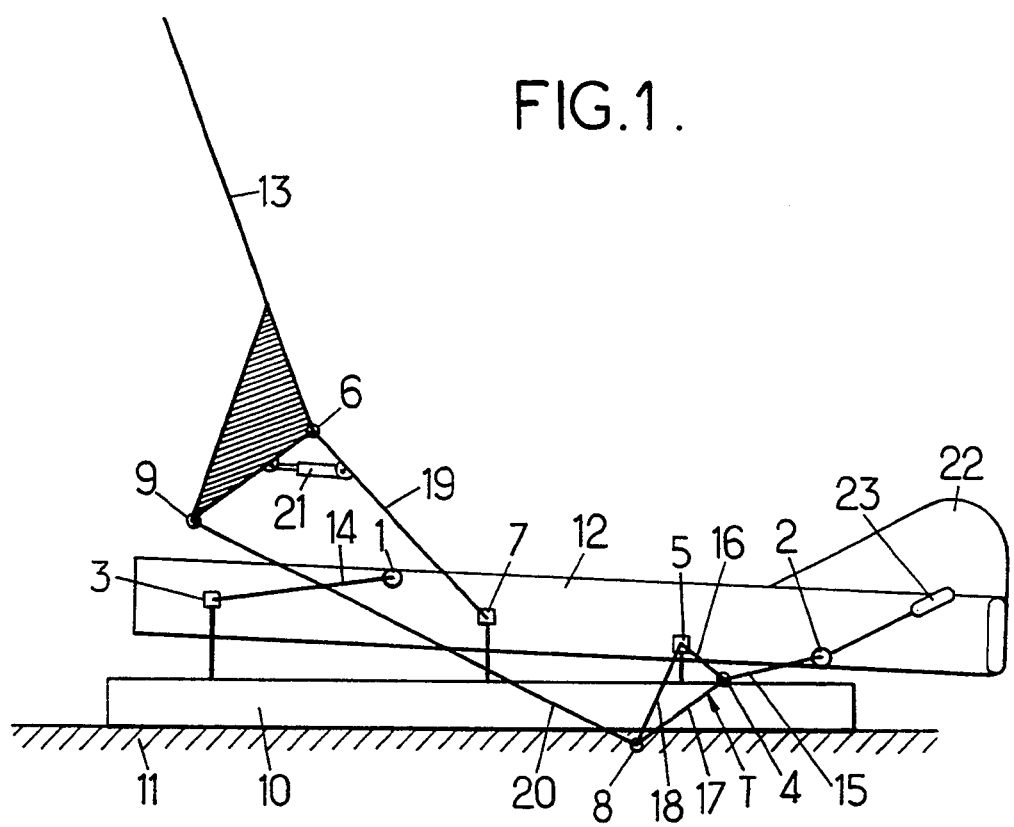
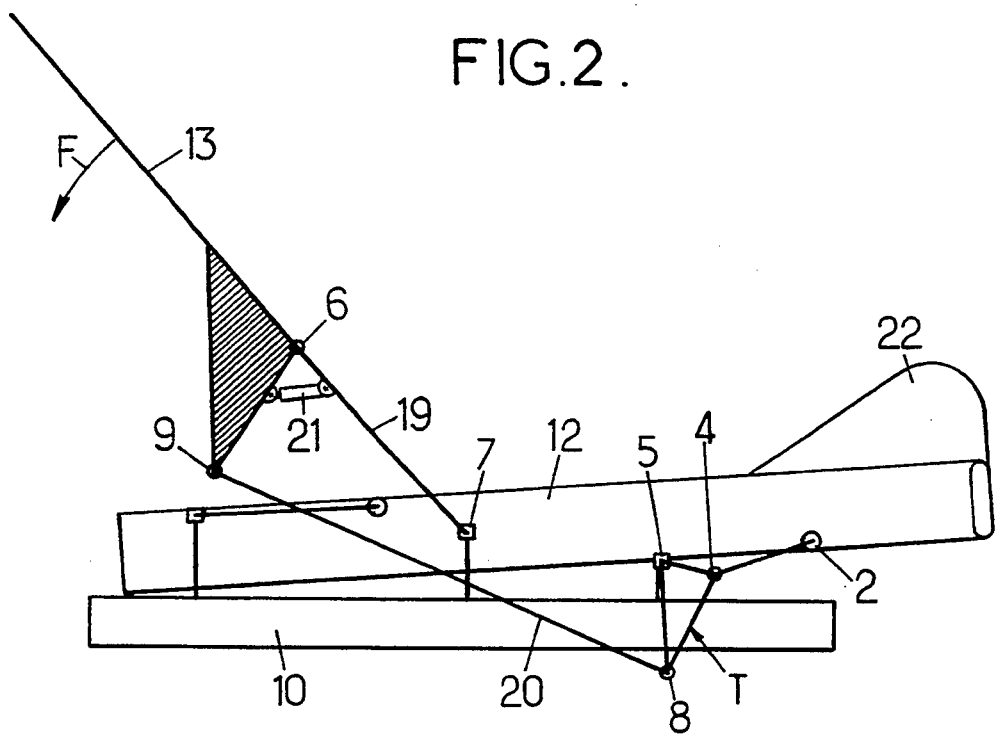

VEHICLE SEATS HAVING MULTIPLE ADJUSTMENTS

The invention relates to vehicle front seats that comprise a base, a seat proper, and a back, and that lend themselves to adjusting the height and the inclination of the seat proper relative to the base, and to adjusting the inclination of the back and/or the folding down of said back towards the front so as to facilitate access to the back seats of the vehicle.

In the present specification, the term "base" is used to designate the part that supports the seat proper and that may optionally be horizontally displaceable in the longitudinal direction of the vehicle relative to the vehicle floor, said part, when displaceable, generally comprising two top section members suitable for sliding longitudinally along two bottom section members that are fixed to the floor, in an assembly forming two slideways.

For simplification purposes, the term "rod" is used herein to designate either a single rigid rod as such or else a pair of rigid rods disposed on respective sides of the seat concerned and connected together by any appropriate transverse spacer means.

Similarly, the term "axes" is used herein to designate transverse horizontal hinge axes, i.e. geometrical axes that extend perpendicularly to the longitudinal direction of the vehicle, and that may be physically embodied in any suitable manner.

Amongst seats of the kind in question, the invention relates more particularly to those in which the seat proper is mounted on the base by means of two rods, a rear rod and a front rod, the top ends of the rods being pivotally mounted about two axes secured to the seat proper, the bottom end of the rear rod being pivotally mounted about a third axis secured to the base, and the bottom end of the front rod being pivotally mounted about a fourth axis linked to the base.

A particular object of the invention is to ensure that seats of the kind in question satisfy various practical requirements better than seats known heretofore, and in particular:
- they lend themselves to "relaxed" or "laid-back" operation, i.e. variations in the inclination of the back automatically give rise to variations in the inclination of the seat proper, with any increase in the inclination of the back towards the rear of the vehicle causing the rear of the seat proper to slope down further from the horizontal, and vice versa, with it still being possible to fold the back forwards; and
- the elements constituting said seats (bases, seats proper, and backs) remain connected to one another by the rigid connecting rods under all circumstances, with the fastening systems Of certain prior Structures that are temporarily unfastened for performing certain adjustments being totally omitted In the present case, thereby increasing safety.

To this end, seats of the kind concerned by the present invention are essentially characterized in that:
- the fourth axis is linked to the base via a rigid triangle itself pivotally mounted about a fifth axis secured to the base and disposed behind the fourth axis and a little above it;
- in that the back is pivotally mounted firstly about a sixth axis for adjusting inclination and secondly about a folding down seventh axis secured to the base; and
- in that a relatively long third rigid rod connects an eighth axis secured to the triangle and disposed lower down than the fourth and fifth axes and behind the fourth axis to a ninth axis secured to the back and disposed behind the sixth axis and lower down than the sixth axis in normal positions, i.e. when the back is not folded down.

In preferred embodiments, the following dispositions are used on their own and/or together:
- the sixth axis is connected to the seventh axis by a fourth rod obliquely inclined downwards and forwards from said sixth axis in normal positions of the back, i.e. when it is not folded down;
- the seventh axis secured to the base is situated about halfway between the third and fifth axes;
- the rigid triangle is substantially isosceles in shape, having a short side interconnecting the fourth and fifth axes and two long sides connecting the eighth axis to the fourth and fifth axes respectively; and
- the lengths of the four rods are respectively as follows, for the first, second, and fourth rods: 25 mm to 120 mm, and for the relatively long third rod, 200 mm to 300 mm.

Apart from the above main dispositions, the invention includes certain other dispositions that are preferably used simultaneously therewith and that are explained in greater detail below.

A preferred embodiment of the invention is described below with reference to the accompanying drawings, description naturally being non-limiting.

FIG. 1 of the drawings is a highly diagrammatic side view of a multiply-adjustable vehicle seat implemented in accordance with the invention, shown in its state that corresponds to the seat proper being in its low position and the back being normally inclined.

Figure 4:
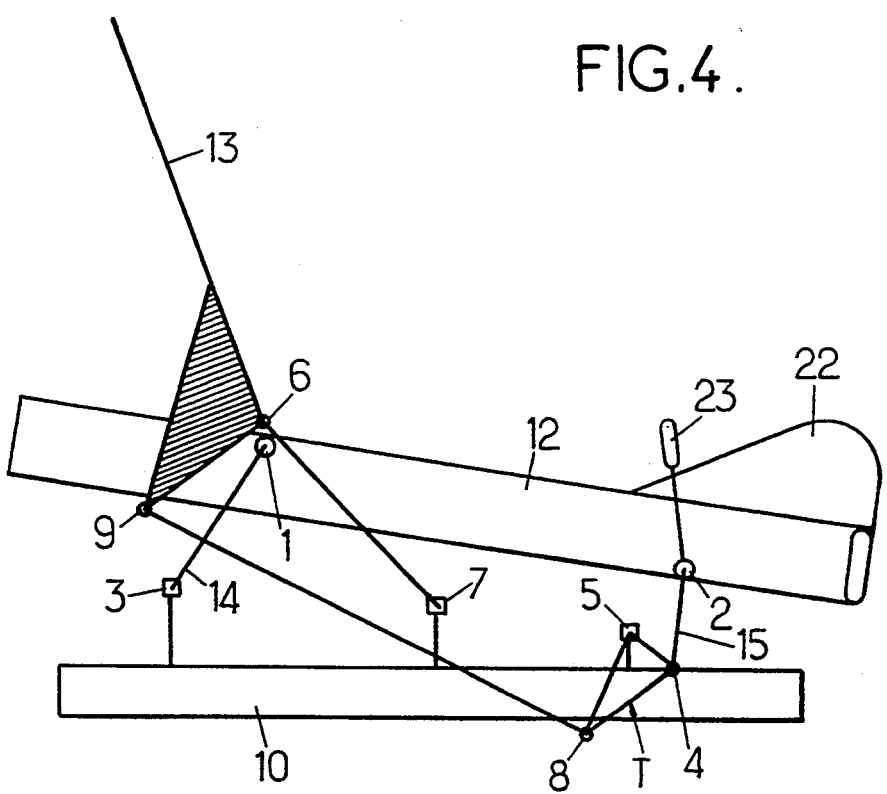

FIGS. 2, 3, and 4 respectively show,
- the back in a "relaxed" more laid-back inclination thereof;
- the back folded down towards the front; and
- the seat proper raised to its high position.

The seat in question comprises:
- a base 10 which is preferably adjustable in forwards or backwards position relative to the floor 11 of the vehicle and which includes, for this purpose, conventional longitudinal slideways, said base being secured to said floor in any of its adjusted positions;
- a seat proper 12; and
- a back 13.

The seat proper and the back each comprise a frame and a cushion: in the present specification, the terms "seat proper" and "back" relate more precisely to their frames.

A height adjusting mechanism or "lift" is interposed between the base and the seat proper, and comprises two rigid connecting rods in the sense given above, namely a rear rod 14 and a front rod 15, both extending rearwards and downwards from the seat proper.

The front top ends of these two rods are pivotally mounted respectively about a first axis 1 and a second axis 2, both secured to the seat proper 12.

The bottom rear end of the rear rod 14 is pivotally mounted about an axis 3 secured to the base.

The bottom rear end of the front rod 15 is pivotally mounted about a fourth axis 4 which is itself linked to a fifth axis 5 secured to the base 10 by means of a crank 16 forming part of a rigid triangle T.

The crank 16 which connects together the axes 4 and 5 extends upwards and rearwards from the axis 4 and constitutes a small base of an isosceles triangle defining the triangle T: the apex of this isosceles triangle disposed opposite from its small base 16 and connected to the two axes 4 and 5 via two substantially identical long sides 17 and 18 respectively is designated in the drawing by reference 8 and is disposed beneath both of said axes.

The back 13 is mounted to pivot firstly about a sixth axis 6 for the purpose of adjusting its inclination, and secondly about a seventh axis 7 which is secured to the base 10 and which serves for the purpose of folding down the back.

The two axes 6 and 7 may coincide and constitute a single axis.

In the preferred embodiment shown, these two axes 6 and 7 are distinct and they are connected together by a rigid rod 19 that extends downwards and forwards from the axis 6: this disposition makes it possible to clear larger amount Of rear space when the back is folded down forwards.

Finally, a relatively long "relaxation" rod 20 has its front bottom end pivotally mounted on the triangle T about the axis 8 and its top rear end pivotally mounted about a ninth axis 9 secured to the back 13 and disposed in normal inclination positions of said back, i.e. non-tilted positions, behind the axis 6 and beneath it.

In the figures, which are side views of the seat, each of the nine transverse horizontal axes 1 to 9 is represented by a point; axes 1 and 2 which are secured to the seat proper are surrounded by relatively large circles; axes 3, 5, and 7 which are secured to the base are surrounded by squares, and the other four axes 4, 6, 8, and 9 are surrounded by small circles.

In the drawings, it can be seen that axis 7 secured to the base is practically halfway between the axes 3 and 5 that are also secured to the base.

The various pivoting mounts around the axes 1 to 9 are advantageously implemented by means of rivets having enlarged heads that co-operate with the adjacent edges of holes formed in vertical plates.

In preferred embodiments, the lengths of the rods 14, 15, and 19 all lie within the range 25 mm to 120 mm, and the length of the relatively long rod 20 lies in the range 200 mm to 300 mm.

Using the seat as described above, the inclination of its back and consequently the inclination of its seat proper can be adjusted at will in the same direction, the back can be folded down forwards while memorizing its inclination prior to being folded down, and the level of the seat proper can be adjusted.

Each of those three commands is respectively performed by unlocking and then pivoting:

the back 13 about the axis 6;
the back 13 while tied to the rod 19 about the axis 7; and
the rod 15 about the axis 2.

The first and third commands may be motor driven or manual, and if manual they are advantageously associated with compensation means (for compensating weight or back thrust) with the help of appropriate springs.

The second command is generally performed by displacing the top of the back after releasing the rod 19 to rotate about the axis 7.

These various commands give rise to the following effects.

By way of example, the initial or rest position may be taken as being the position shown in FIG. 1, where the seat proper 12 is in its lowest position, and the back 13 is at a normal inclination.

Pivoting is then prevented about the three axes 2, 6, and 7.

In FIG. 2, the back 13 has moved to a relaxation position which is more laid-back than in FIG. 1.

To move to this position, it suffices to release pivoting of said back about the axis 6 and to make use, for example, of a small actuator 21 (FIG. 1) interposed between the rod 19 and the back 13.

It may be observed that the resulting angular displacement of the back 13 about the axis 6 in the direction of arrow F in FIG. 2 has the effect of displacing the relatively long relaxation rod 20 forwards, causing the triangle T to pivot about the axis 5 and slightly raising the axis 6 and the axis 2 which is then the only axis prevented from rotating relative to the seat proper.

In other words, inclining the back 13 backwards automatically causes the front edge 22 of the seat proper to rise, as can be seen clearly in FIG. 2: this is the relaxation function of the seat.

For example, the backwards inclination of the seat proper relative to the horizontal may go from 0° to about 6° when the backwards inclination of the back relative to the vertical goes from 15° to 45°.

In FIG. 3, and relative to FIG. 1, pivoting about the axis 6 remains locked and it is pivoting about the axis 7 that has been unlocked, thus making it possible to fold down the back 13 forwards as shown by arrow G.

It can be seen while the back is being folded down, the positions of the various axes 2, 3, 4, 5, 7, and 8 remain practically unchanged relative to their reference positions in FIG. 1. However, the axis 1 is a little lower so that the back of the seat proper 12 moves down slightly, thereby facilitating access to the back seats.

Finally, in FIG. 4, the back has remained in practically the same position as it occupies in FIG. 1, while the seat proper 12 has been raised by pivoting the rod 15 about the axis 2: in FIGS. 1 and 4, there can be seen a control handle 23 which is assumed to be angularly tied to said rod 15 and which can be rotated about the axis 2 for the purpose of lifting the seat proper as shown.

In its raised position, it can be seen that the seat proper is downwardly inclined a little towards the front.

In this raised position, each of the two rods 14 and 15 is at a steep angle relative to the horizontal and the above-indicated inclination effect of the seat proper is due, in part, to the fact that the rear rod 14 is longer than the front rod 15.

As a result, and regardless of the embodiment adopted, a vehicle seat is obtained that lends itself to multiple adjustments, and in particular a seat is obtained which, compared with prior art seats, has the major advantage that all of its various component elements remain connected to one another by the rods under all circumstances.

Naturally, and as can be seen from the above, the invention is not limited in any way to the particular applications and embodiments that are specifically envisaged; on the contrary, it extends to any variants, in particular those in which the seventh axis coincides with the sixth, which simplifies construction while still retaining adequate accessibility to the back seats when the seat back is tilted forwards.

We claim:

1. A vehicle front seat comprising a base (10), a seat proper (12), and a back (13), and for which the seat proper is mounted on the base by means of two rods, a rear rod (14) and a front rod (15), the top ends of the rods being pivotally mounted about two axes (1, 2) secured to the seat proper, the bottom end of the rear rod being pivotally mounted about a third axis (3) secured to the base, and the bottom end of the front rod the base, the front seat being characterized in that the triangle (T) itself pivotally mounted about a fifth axis (5) secured to the base and disposed behind the fourth axis (4) and above it; in that the back is pivotally mounted firstly about a sixth axis (6) for adjusting inclination and secondly about a tilting seventh axis (7) secured to the base; and in that a relatively long third rigid rod (20) connects an eighth axis (8) secured to the triangle and disposed lower down than the fourth and fifth axes (4, 5) and behind the fourth axis to a ninth axis (9) secured to the back and disposed behind the sixth axis (6) and lower down than the sixth axis in normal positions.

2. A seat according to claim 1, wherein the sixth axis (6) is connected to the seventh axis (7) by a fourth rod (19) obliquely inclined downwards and forwards from said sixth axis in normal positions of the back (13).

3. A seat according to claim 2, wherein the lengths of the four rods are respectively as follows, for the first, second, and fourth rods: 25 mm to 120 mm, and for the relatively long third rod, 200 mm to 300 mm.

4. A seat according to claim 1, wherein the seventh axis (7) coincides with the sixth axis (6).

5. A seat according to claim 1, wherein the seventh axis (7) secured to the base is situated about halfway between the third and fifth axes (3, 5).

6. A seat according to claim 1, wherein the rigid triangle (T) is substantially isosceles in shape, having a short side interconnecting the fourth and fifth axes (4, 5) and two long sides connecting the eighth axle (8) to the fourth and fifth axes respectively.

* * * * *